UNITED STATES PATENT OFFICE.

ALBERT FRAASS, OF BERLIN, GERMANY.

ARTIFICIAL STONE AND PROCESS OF MAKING SAME.

1,078,845.  Specification of Letters Patent.  Patented Nov. 18, 1913.

No Drawing.  Application filed March 23, 1911.  Serial No. 616,302.

*To all whom it may concern:*

Be it known that I, ALBERT FRAASS, a citizen of the German Empire, and a resident of Berlin, Germany, have invented a certain new and useful Artificial Stone and Process for Making the Same, of which the following is a specification.

My invention relates to artificial stone, having magnesia as a base, and more particularly to such stone as is used for floors in buildings and has for its object to produce a substance of this kind which is homogeneous in structure and has sufficient toughness and durability to render it particularly useful for this purpose. Heretofore, artificial stone of this kind has been manufactured by mixing together in a dry state, magnesite, ground wood, asbestos and talc, as well as coloring substances, other mineral substances and other filling substances, if desired, and adding to this mixture a suitable amount of a solution of chlorid of magnesium. The substance thus made was not found to be durable when used as a floor covering; its surface soon became roughened and small particles in the form of a dust became separated therefrom. The action is attributable to the fact that the chlorid of magnesium, when added to the mixture of other ingredients, quickly reacts upon the magnesite, forming a hard mass without penetrating to any great extent into the pores and among the constituent particles of the other substances. The finished material therefore consists of a woven-like skeleton composed of a basic chlorid of magnesium in the interstices of which the other ingredients are distributed without being homogeneously combined with the substances forming the skeleton. The basic cholorid of magnesium being brittle, particles of the skeleton structure are easily worn off when the floor is trod upon, resulting in the loosening and setting free, as a dust or powder, of large quantities of the filling substances.

The process of my invention forms a homogeneous product by closely uniting the different ingredients thereof together and overcomes the objectionable features of the artificial stone made by the process just described.

The process of my invention is carried out as follows: Asbestos and talc are added to a solution of chlorid of magnesium and thoroughly distributed throughout the same by mechanically stirring the mixture. To this mixture are added whatever filling and coloring substances it is desired to use and the whole is stirred so as to cause the added ingredients to be suspended in the solution. It is found that they will remain suspended so that no separation of the solid from the liquid constituents of the mixture will take place even if the mixture is allowed to stand for some time. Shortly before use, burnt magnesite or magnesium oxid is added to the mixture, causing the whole to harden quickly. The oxychlorid of magnesium thus formed permeates not only the cavities between the different filling substances, but also the pores of said substances and it is apparent that a homogeneous and therefore durable and lasting stone is produced. The magnesium compound contacts with substantially all of the particles of the other ingredients and serves to bind them firmly together. Another beneficial result of this process is that by reason of the close combination of the elastic asbestos with the oxychlorid of magnesium, the product has a certain degree of elasticity, a quality which the asbestos does not give to the product made by the former process.

Another advantage over the former process is found in the fact that oils or fats can be added in my process without causing the deleterious effects which the addition of such substances causes when added in the former process. The addition of oily and fatty substances to the dry mixture forms clots and lumps and in spite of careful mixing, it is impossible to bring the small amounts of oil which are used in contact with all parts of the dry mixture. On the other hand when my process is followed, oily and fatty substances form a permanent emulsion with the solution of chlorid of magnesium to which asbestos and talc has been added. This results in an equal and thorough mixture of such substances with the other ingredients.

My process accordingly is carried out by thoroughly mixing the desired quantities of oily and fatty substances with the solution of chlorid of magnesium which has been previously thickened with asbestos and talc, then adding to this emulsion other filling substances as desired, and lastly adding the burnt magnesite. Artificial stone thus made has a remarkable toughness and durability due to the equal distribution of the oily and fatty substances throughout the mass.

When I refer in my claims to the use of asbestos and talc, I intend to claim the use of one of the substances or both, or of any equivalent thereof.

When I speak in my claims of an oleaginous substance, I intend to refer to any oily or fatty substance suitable for use in an artificial stone of this kind and when I refer to a filling substance, I mean to include substances which have the property of coloring the artificial stone.

I claim as my invention:

1. The process of making artificial stone which consists in mixing asbestos and talc with magnesium chlorid, forming an emulsion by adding an oleaginous substance, adding a filler to this emulsion and then adding burnt magnesite.

2. An artificial stone comprising a coherent, homogeneous mass composed of asbestos, talc, a filling substance and an oleaginous substance, thoroughly saturated with basic magnesium chlorid, the particles of all of these ingredients being firmly bound and thoroughly mixed together.

In testimony whereof I have hereunto set my hand in the presence of two subscribing witnesses.

ALBERT FRAASS.

Witnesses:
HENRY HASPER,
WOLDEMAR HAUPT.